(12) United States Patent
Gang et al.

(10) Patent No.: US 11,244,081 B2
(45) Date of Patent: Feb. 8, 2022

(54) ELECTRONIC DEVICE AND METHOD FOR CONTROLLING CONNECTION OF EXTERNAL DEVICE USING THE SAME

(71) Applicant: Samsung Electronics Co., Ltd., Gyeonggi-do (KR)

(72) Inventors: Heedong Gang, Gyeonggi-do (KR); Jinhui Park, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 133 days.

(21) Appl. No.: 16/572,760

(22) Filed: Sep. 17, 2019

(65) Prior Publication Data

US 2020/0089920 A1 Mar. 19, 2020

(30) Foreign Application Priority Data

Sep. 18, 2018 (KR) .......................... 10-2018-0111709

(51) Int. Cl.
*G06F 21/85* (2013.01)
*G06F 13/10* (2006.01)
(Continued)

(52) U.S. Cl.
CPC ............ *G06F 21/85* (2013.01); *G06F 13/105* (2013.01); *H04W 4/80* (2018.02); *H04W 76/10* (2018.02)

(58) Field of Classification Search
CPC ........ G06F 21/85; G06F 13/105; H04W 4/80; H04W 76/10
See application file for complete search history.

(56) References Cited

U.S. PATENT DOCUMENTS 6,677,989 B1 * 1/2004 Aizawa .............. H04N 1/00204
348/207.1
9,734,358 B2 8/2017 Soffer
(Continued)

FOREIGN PATENT DOCUMENTS

EP 3040902 A1 7/2016
GB 2424344 A 9/2006
(Continued)

OTHER PUBLICATIONS

Translation of KR20180040264 (Year: 2018).*
International Search Report dated Dec. 24, 2019.
European Search Report dated Sep. 7, 2021.

*Primary Examiner* — Henry Tsai
*Assistant Examiner* — John B Roche
(74) *Attorney, Agent, or Firm* — Cha & Reiter, LLC

(57) ABSTRACT

A method and electronic device are disclosed herein. The electronic device includes at least one connector, at least one switch electrically connected to the at least one connector, a sensor, a memory, and a processor electrically connected to the at least one connector, the at least one switch, the sensor, and the memory. The processor implements the method, including detecting insertion of an external device into the at least one connector based on an electrical signal input through the at least one connector, receiving biometric information using the sensor after detecting the insertion of the external device, and controlling a switch electrically connected to the connector to be connected to the connector into which the external device is inserted when the received biometric information matches biometric information stored in the memory.

20 Claims, 5 Drawing Sheets

(51) Int. Cl.
  *H04W 76/10* (2018.01)
  *H04W 4/80* (2018.01)

(56) References Cited

U.S. PATENT DOCUMENTS

| | | | |
|---|---|---|---|
| 2009/0069052 A1 | 3/2009 | Jain et al. | |
| 2011/0173425 A1 | 7/2011 | Xiao | |
| 2012/0268247 A1* | 10/2012 | Boot | B60L 53/64 |
| | | | 340/5.83 |
| 2012/0299547 A1 | 11/2012 | Lee et al. | |
| 2015/0324605 A1* | 11/2015 | Yoon | G06F 21/6245 |
| | | | 726/28 |
| 2016/0359349 A1 | 12/2016 | Todd et al. | |
| 2017/0223807 A1* | 8/2017 | Recker | H02J 13/0017 |
| 2018/0276395 A1* | 9/2018 | Bostick | H04L 65/403 |

FOREIGN PATENT DOCUMENTS

| | | | | |
|---|---|---|---|---|
| KR | 10-2009-0127676 A | 12/2009 | | |
| KR | 10-2010-0081317 A | 7/2010 | | |
| KR | 10-2015-0059473 A | 6/2015 | | |
| KR | 10-2018-0005679 A | 1/2018 | | |
| KR | 10-2018-0040264 A | 4/2018 | | |
| KR | 20180040264 A | * | 4/2018 | ........... H04L 9/3231 |

\* cited by examiner

ELECTRONIC DEVICE AND METHOD FOR CONTROLLING CONNECTION OF EXTERNAL DEVICE USING THE SAME

CROSS-REFERENCE TO RELATED APPLICATION(S)

This application is based on and claims priority under 35 U.S.C. § 119 to Korean Patent Application No. 10-2018-0111709, filed on Sep. 18, 2018, in the Korean Intellectual Property Office, the disclosure of which is incorporated by reference herein in its entirety.

BACKGROUND

Field

Various embodiments of the disclosure relate to an electronic device and a method for controlling a connection of an external device using the same.

Description of the Related Art

With the development of wireless communication technology, various types of electronic devices, such as a smart phones and tablet personal computers (PCs), may be capable of executing various functions. For example, an electronic device, such as a PC, may store data generated by the electronic device and/or transmitted from an external electronic device, and it may also transmit data to an external device, such as a universal serial bus (USB).

In the case where an electronic device, such as a PC, transmits data to an external device, such as a USB drive, secured data related to user's personal information and/or business-related information, stored in the electronic device, may be transmitted by an unauthenticated user. In order to prevent secure data from being transmitted by an unauthenticated user, an electronic device (e.g., wearable device or a smart phone that a user generally wears or carries everyday) may be connected to a PC through wireless communication, such as, for example, Bluetooth. The PC may detect a distance to the user wearing/carrying the electronic device (as paired via Bluetooth), and if the user is excessively far from the PC, the PC may deactivate the PC to limit operation of the data transmission/reception function.

SUMMARY

In the case of connecting an electronic device to a PC through Bluetooth, Bluetooth connectivity is generally maintained in an active state while the PC is used, which may cause excessive power consumption. Further, because Bluetooth is connected through a network, a wireless signal strength may vary depending on various conditions within the surrounding environment, which may render it difficult to determine an accurate distance between the electronic device and the PC.

An electronic device according to certain embodiments of the disclosure can perform user authentication using a sensor, for example, a biosensor, if an external device is inserted into a connector of the electronic device. If the user authentication has succeeded, the electronic device can perform data transmission/reception function by controlling to connect to the external device inserted into the connector.

According to certain embodiments of the disclosure, an electronic device may include at least one connector, at least one switch electrically connected to the at least one connector, a sensor, a memory, and a processor electrically connected to the at least one connector, the at least one switch, the sensor, and the memory, wherein the processor is configured to: detect an insertion of an external device into the at least one connector based on an electrical signal input through the at least one connector, receive biometric information using the sensor after detecting the insertion of the external device, and control a switch electrically connected to the connector to be connected to the connector into which the external device is inserted, when the biometric information matches biometric information stored in the memory.

According to certain embodiments of the disclosure, a method in an electronic device is disclosed, including detecting insertion of an external device into at least one connector based on an electrical signal input through the at least one connector, receiving biometric information using a sensor after detecting the insertion of the external device, and controlling a switch electrically connected to the connector to be connected to the connector into which the external device is inserted when the received biometric information matches biometric information stored in a memory.

According to certain embodiments of the invention, an electronic device is disclosed, including: at least one connector, at least one switch electrically connected to the at least one connector, a memory, and a processor electrically connected to the at least one connector, the at least one switch, and the memory, wherein the processor is configured to: detect insertion of an external device into the at least one connector based on an electrical signal input through the at least one connector, receive user authentication information after detecting the insertion of the external device, and control a switch to electrically connected to the connector to be connected to the connector into which the external device is inserted when the received user authentication information matches user authentication information stored in the memory.

The electronic device according to certain embodiments of the disclosure can control the connection of the external device inserted into the connector if the user authentication using the biosensor has succeeded through the insertion of the external device into the connector. If the user authentication has succeeded, data transmission and reception with the external device can be performed, and thus it is possible to prevent the data related to the information utilizing the security from being transmitted by the unauthenticated user.

The electronic device according to certain embodiments of the disclosure can control the connection of the external device inserted into the connector based on the user authentication using the biosensor, and thus the connection to the separate electronic device through the network may be unnecessary.

DETAILED DESCRIPTION

Figure 1:
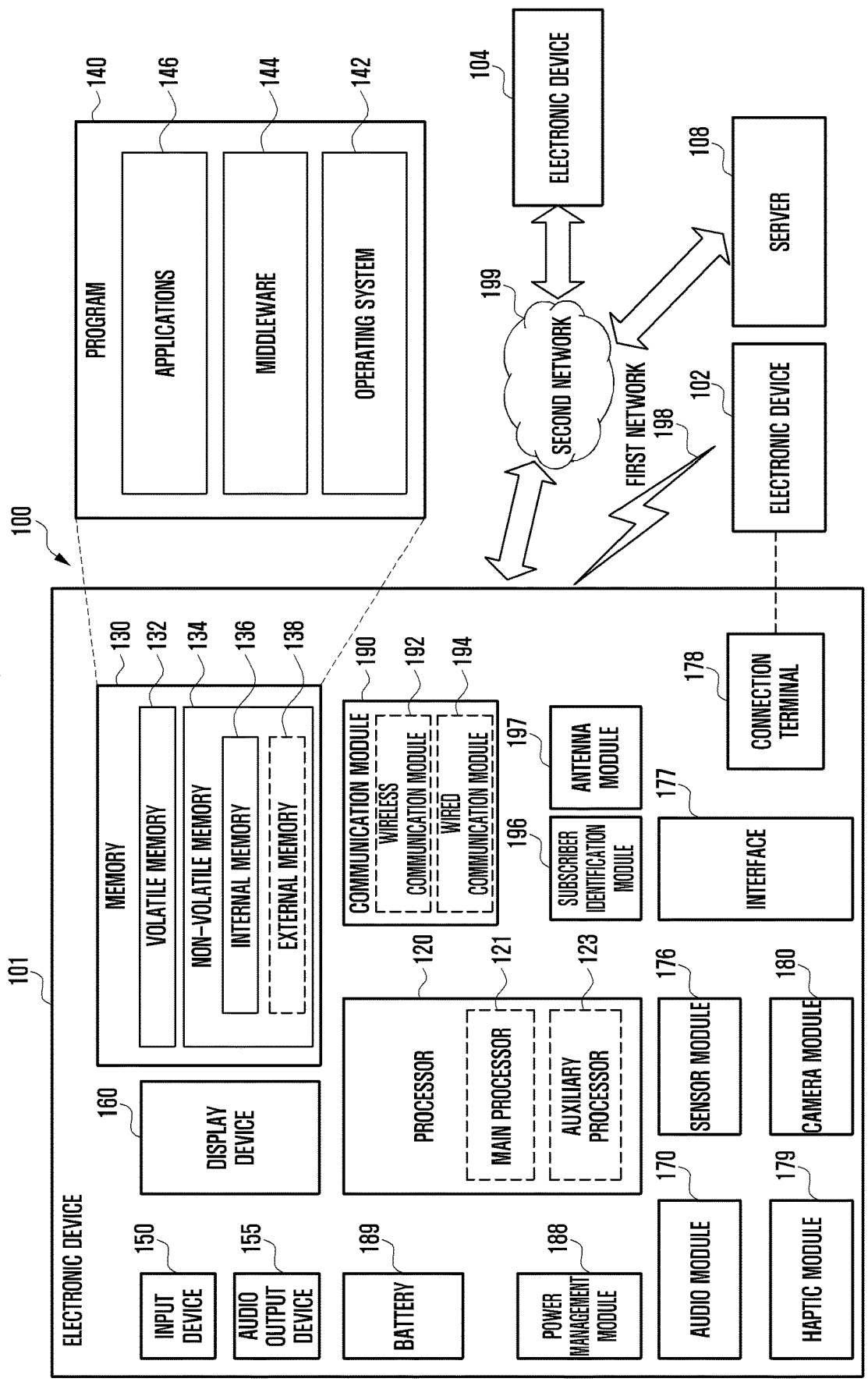
FIG. 1 is a block diagram of an electronic device in a network environment, controlling a connection of an external device, according to certain embodiments.

FIG. 1 is a block diagram of an electronic device 101 in a network environment 100, controlling a connection of an external device, according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented by a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
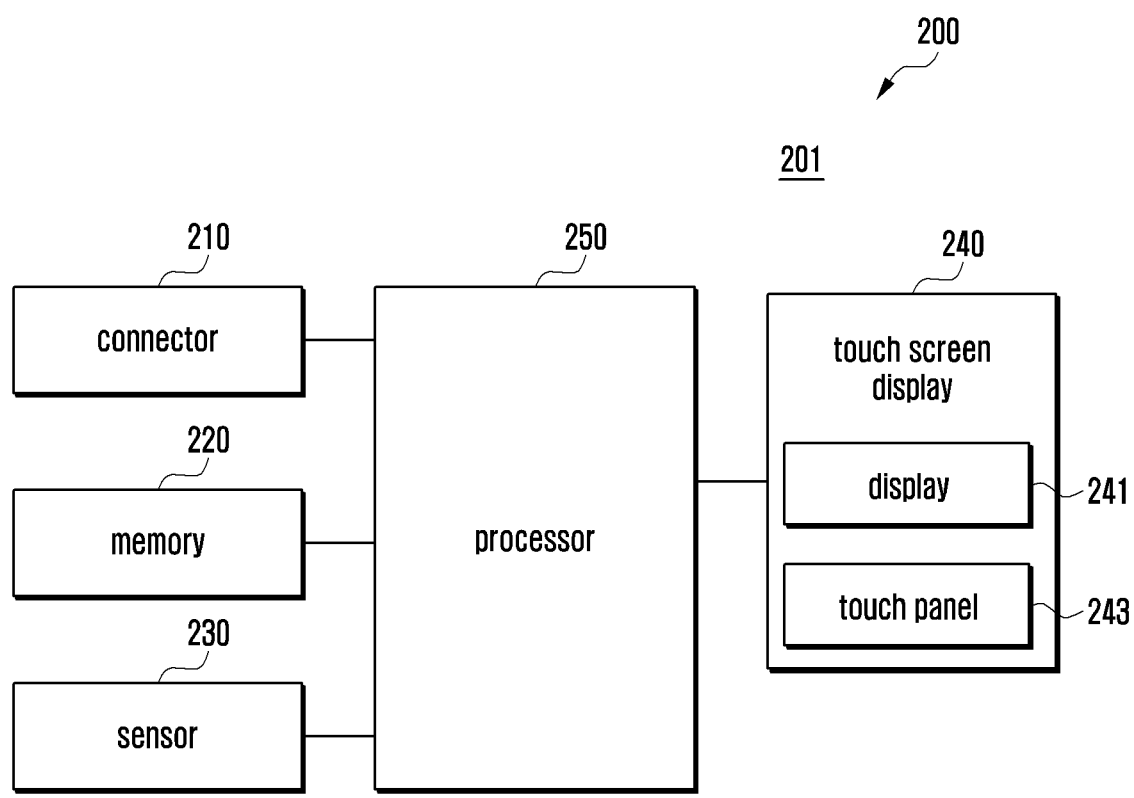
FIG. 2 is a block diagram illustrating an electronic device, controlling a connection of an external device, according to certain embodiments.

FIG. 2 is a block diagram 200 of an electronic device 201, controlling a connection of an external device, according to certain embodiments.

With reference to FIG. 2, an electronic device 201 (e.g., electronic device 101 of FIG. 1) may include a connector 210 (e.g., connection terminal 178 of FIG. 1), a memory 220 (e.g., memory 130 of FIG. 1), a sensor 230 (e.g., sensor module 176 of FIG. 1), a touch screen display 240 (e.g., display device 160 of FIG. 1), and a processor 250 (e.g., processor 120 of FIG. 1).

In an embodiment, the connector 210 may be, for example, an element included in the connection terminal 178 of FIG. 1, and may include, for example, one or more pins for transmitting and receiving data with an external device. The connector 210 may support a physical connection to the external device, and may include, for example, at least one of an HDMI connector, a USB connector, or an SD card connector.

In an embodiment, the memory 220 may store predesignated conditions for sensing whether the external device is inserted into the connector 210 (e.g., a current value when the external device is inserted into the connector 210 and a current value when the external device is separated from the connector). The memory 220 may store a program controlling a connection of the external device as the external device is inserted into the connector 210 (e.g., a program for approving or blocking the connection of the external device). The memory 220 may store a program for user authentication that may enable or disable the communicative connection of the external device.

In an embodiment, the memory 220 may store authentication information utilized in authenticating comparisons executed again user information acquired through the sensor 230, such as a designated password, designated pattern data, or biometric information. Biometric information, for example, may include a fingerprint image, a facial image (e.g., feature related to a user's face, a feature of each portion of a face, or feature related to an iris of an eye), or speech information.

In an embodiment, a plurality of users may utilize the electronic device 201, and in this case, the memory 220 may pre-store user authentication information pertaining to each of the plurality of users.

In an embodiment, the sensor 230 may include a biosensor. For example, the biosensor may include at least one of a fingerprint sensor or an image sensor (e.g., camera module 180 of FIG. 1).

In an embodiment, the fingerprint sensor may be utilized to acquire user's fingerprint information. For example, an object, such as a user's finger, may contact the fingerprint sensor, and the fingerprint sensor may then acquire the fingerprint information in accordance with the touch contact of the finger.

In another embodiment, the image sensor, such as the camera module, may operate as a biosensor (e.g., as an iris sensor or face recognition sensor) that collects the user's biometric information, and/or it may be implemented as to include the biosensor (e.g., iris sensor or face recognition sensor). The camera module may capture an image of a user's in a photographing area, which may then be used for facial recognition authentication, or it may recognize the iris.

In an embodiment, the sensor 230 may include a speech recognition sensor. The speech recognition sensor may be utilized to algorithmically recognize the user's speech acquired from an audio module (e.g., audio module 170 of FIG. 1).

In an embodiment, methods for fingerprint recognition, face recognition, and speech recognition are known technologies that are apparent to those of ordinary skill in the art to which the disclosure pertains, and thus detailed explanation thereof will be omitted.

In an embodiment, the touch screen display 240 may display various screens in accordance with the usage of the electronic device 201. The touch screen display 240 may be integrally configured to include a display 241 and a touch panel 243. The display 241 may display, for example, various kinds of content (e.g., text, image, video, icon, or symbol). Further, the display 241 may include a liquid crystal display (LCD), a light-emitting diode (LED) display, an organic light-emitting diode (OLED) display, a microelectromechanical systems (MEMS) display, or an electronic paper display. The touch panel 243 may receive, for example, a touch, gesture, proximity, or hovering input using an electronic pen or a part of the user's body.

In an embodiment, if the external device is inserted into the connector 210, the touch screen display 240, under the control of the processor 250, may display a user interface (UI) for performing user authentication. For example, the user interface for performing the user authentication may include a user interface for requesting user authentication, and display a guide image facilitating input of information utilized for user authentication by the user.

In an embodiment, the touch screen display 240, the processor 250 may control the display to display a user interface related to a state where the connection of the external device is blocked due to a user authentication failure.

In an embodiment, the processor 250 may control the overall operation of the electronic device 201, and a signal flow between internal configurations (or components) of the electronic device 201, perform data processing, and control a power supply from a battery (e.g., battery 189 of FIG. 1) to the configurations.

In an embodiment, if an insertion of the external device into the connector 210 is sensed/detected, the processor 250 may generate a prompt requesting acquisition the user's authentication information. For example, after displaying a user interface field or security pattern challenge, the processor 250 may receive an input of a password or a designated pattern. Furthermore, the processor 250 may acquire the user's biometric information through the sensor 230. For example, the biometric information may include at least one of user's fingerprint information, iris information, face information, or speech information. The processor 250 may determine whether the acquired user authentication information matches the user authentication information stored in the memory 220. If the acquired user authentication information matches the user authentication information stored in the memory 220, the processor 250 may control the switch connected to the connector 210 to communicatively connect to the external device inserted through the connector 210. If the acquired user authentication information does not match the user authentication information stored in the memory 220, the processor 250 may control the switch to block the connection of the external device inserted through the connector 210.

Figure 3:
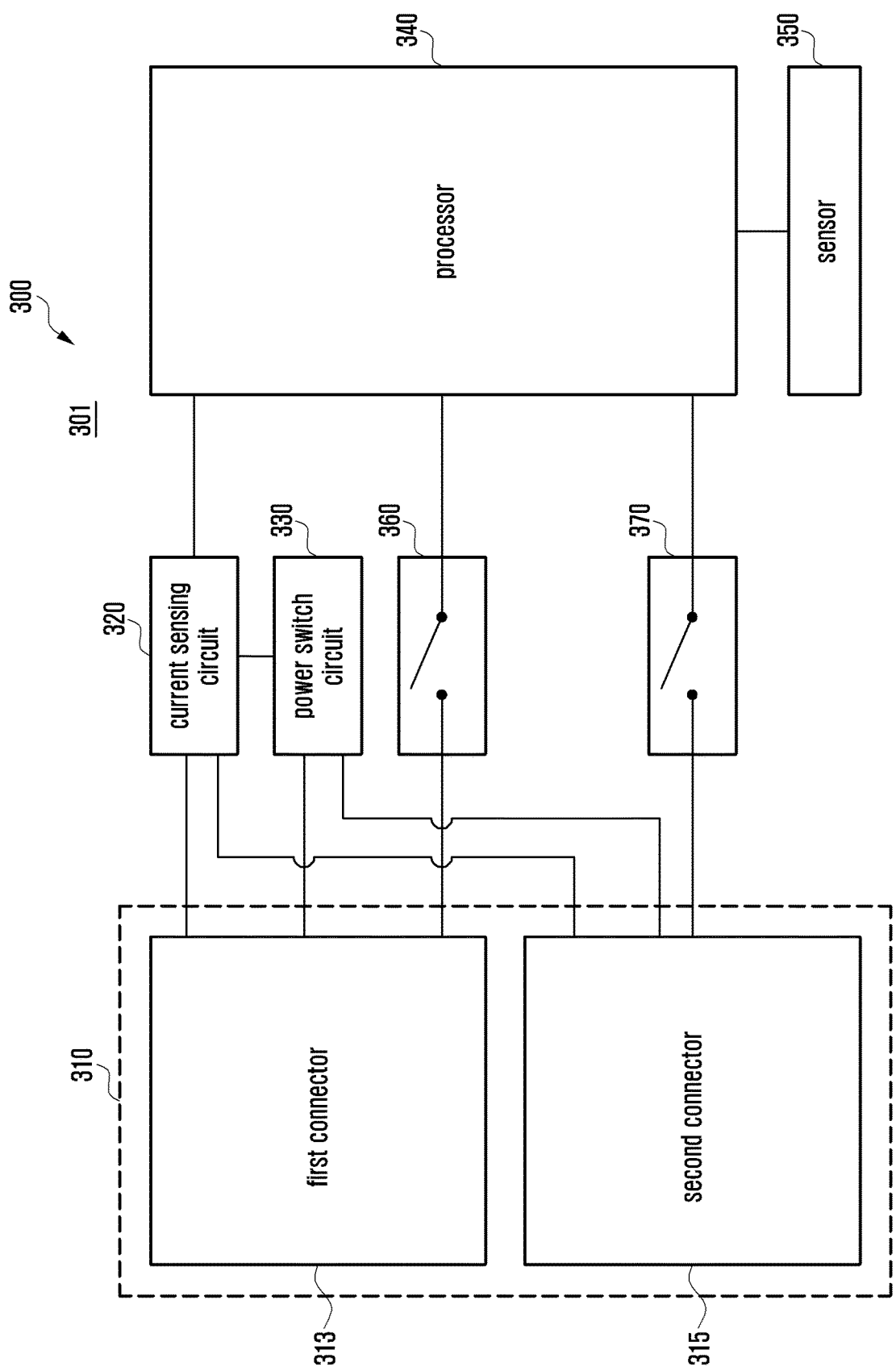
FIG. 3 is a block diagram illustrating an electronic device, controlling a connection of an external device, according to certain embodiments.

FIG. 3 is a block diagram 300 illustrating an electronic device 301, controlling a connection of an external device, according to certain embodiments.

With reference to FIG. 3, an electronic device 301 (e.g., electronic device 101 of FIG. 1 or electronic device 201 of FIG. 2) may include a connector 310 (e.g., connection terminal 178 of FIG. 1 or connector 210 of FIG. 2), a current sensing circuit 320, a power switch circuit 330, a processor 340 (e.g., processor 120 of FIG. 1 or processor 250 of FIG. 2), a sensor 350 (e.g., sensor module 176 of FIG. 1 or sensor 230 of FIG. 2), a first switch 360, and a second switch 370.

In an embodiment, the "connector" 310 (e.g., a connector module) may include one or more physical connectors. Hereinafter, explanation will be made on the assumption that the "connector" 310 includes a first connector 313 and a second connector 315.

In an embodiment, the first connector 313 and the second connector 315 may be connected to the current sensing circuit 320 for sensing the insertion of the external device, and a power switch circuit 330 may be connected to ground (GND) of the first connector 313 and the second connector 315.

In an embodiment, the first switch 360 and the second switch 370 may be connected to the first connector 313 and the second connector 315, respectively. As noted early, the first and second switches 360 and 370 control communicative connection with the external device inserted into the first connector 313 and the second connector 315.

In an embodiment, the current sensing circuit 320 may sense whether the external device is inserted or removed (e.g., separated) from at least one of the first connector 313 or the second connector 315. For example, the power switch circuit 330 (when in an activated state) may be connected to the first connector 313 and the second connector 315. If the external device is inserted into, for example, the first connector 313 in a state where the power switch circuit 330 is in activated (e.g., on) state, a loop may be formed on the ground (GND) of the first connector 313 to allow current flow therein. The current sensing circuit 320 may recognize the current value, and if the recognized current value exceeds a designated value, it may be determined that the external device has been inserted into the first connector 313.

In an embodiment, if it is determined that the external device has been inserted into the first connector 313, the current sensing circuit 320 may transfer, to the processor 340, a signal indicating the insertion of the external device together with identification information.

In an embodiment, if the signal indicating the insertion of the external device and the identification information of the first connector 313 into which the external device is inserted are received from the current sensing circuit 320, the processor 340 may control a display to display a user interface for performing user authentication operation (e.g., displaying a UI display 241 of FIG. 2). For example, the user interface for performing the user authentication operation may include a prompt requesting user authentication, and a visual element related to inputting information the user authentication. However, the user interface is not limited thereto, and other kinds of outputs are possible, such as speech and sounds (e.g., "Put your finger on the sensor") which may be output through a sound output device (e.g., sound output device of FIG. 1), for example, a speaker.

In an embodiment, in response to the reception of the signal indicating the insertion of the external device, the processor 340 may acquire user's authentication information (such as biometric information) through the sensor 350. For example, the sensor 350 may include a biosensor. The biosensor may include at least one of a fingerprint sensor or an image sensor (e.g., camera module 180 of FIG. 1). The processor 340 may acquire biometric information including at least one of fingerprint information, iris information, or facial information, through the sensor 350.

In an embodiment, the processor 340 may compare the user's biometric information (e.g., fingerprint information, iris information, or face information) acquired through the sensor 350 with biometric information pre-stored in the memory (e.g., memory 220 of FIG. 2). Based on the result of the comparison (e.g., whether authentication is successful), the processor 340 may control the switch 360 to connect or block the external device inserted into the first connector 313. For example, if the user's biometric information acquired through the sensor 350 matches the biometric information stored in the memory, the processor 340 may determine authentication is successful and control the first switch 360 to connect to the external device inserted into the first connector 313. If the external device is connected, the processor 340 may perform communication with the external device, for example, data transmission and reception operation. If the user's biometric information acquired through the sensor 350 does not match the biometric information stored in the memory, the processor 340 may determine authentication has failed and control the first switch 360 to block the communicative connection of the external device inserted into the first connector 313.

In an embodiment, because the switch is controlled to connect to the external device only in the case where the user's biometric information matches the biometric information stored in the memory, data related to information utilizing security authentication can be prevented from being transmitted to the external device by an unauthenticated user.

In an embodiment, as the user's biometric information acquired through the sensor 350 matches the biometric information stored in the memory, the processor 340 may acquire the user's biometric information through the sensor 350 at a designated time interval in a state where the external device inserted into the first connector 313 is connected. If the biometric information acquired through the sensor 350 at the designated time interval does not match the biometric information stored in the memory, the processor 340 may control the first switch 360 connected to the first connector 313 to block the connected external device. If the biometric information acquired through the sensor 350 at the designated time interval matches the biometric information stored in the memory, the processor 340 may control the first switch 360 to maintain the connection of the external device to the first connector 313.

In an embodiment, by performing the user authentication operation through acquisition of the biometric information at the designated time interval, the communication with the external device can be prevented from being performed by an unauthenticated user while an authenticated user, for example, vacates the seat.

In an embodiment, if the separation of the external device from the first connector 313 is sensed through the current sensing circuit 320, the processor 340 may control the first switch 360 connected to the first connector 313 to block the connection of the first connector 313.

In an embodiment, although explanation has been made on the assumption that the external device is connected to the first connector 313, the same operation as the operation in accordance with the insertion of the external device into the first connector 313 may be performed even if the external device is inserted into the second connector 315 or the external device is inserted into the first connector 313 and the second connector 315, respectively.

In an embodiment, although explanation has been made on the assumption that the user authentication is the biometric information, the user authentication information is not limited thereto, and the user authentication operation may be performed through a password or a pattern input.

Figure 4:
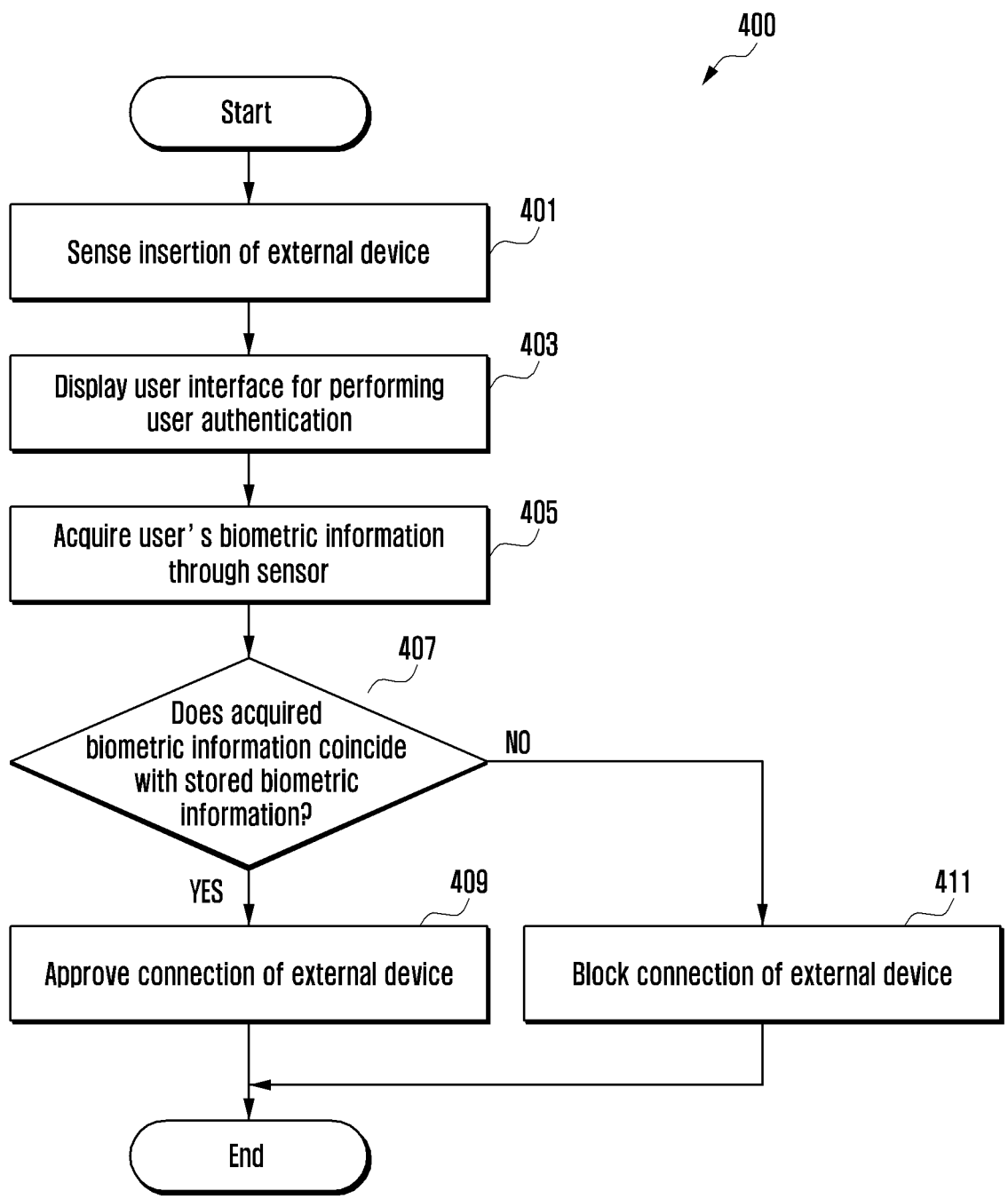
FIG. 4 is a flowchart illustrating a method for controlling a connection of an external device based on user's biometric information according to certain embodiments.

FIG. 4 is a flowchart 400 illustrating a method for controlling a connection of an external device based on user's biometric information according to certain embodiments.

With reference to FIG. 4, at operation 401, the processor (e.g., processor 250 of FIG. 2 or processor 340 of FIG. 3) may sense the insertion of the external device into at least one connector (e.g., connector 210 of FIG. 2 or connector 310 of FIG. 3).

In an embodiment, the current sensing circuit (e.g., current sensing circuit 320 of FIG. 3) may recognize the value of a current generated on the ground (GND) of at least one connector, and if the recognized current value exceeds a designated value, it may determine that the external device is inserted into at least one connector. The current sensing circuit may transfer, to the processor, a signal indicating that the external device has been inserted into the at least one connector.

In an embodiment, if the insertion of the external device is detected, the processor, at operation 403, may display a user interface for performing user authentication on a display (e.g., display 241 of FIG. 2). It is noted the disclosure is not limited to display of a UI, but that the processor may alternatively or additionally output other indicators for receiving biometric information, such as a sound requesting the user authentication through a sound output device (e.g., sound output device 155 of FIG. 1), for example, a speaker.

In an embodiment, at operation 405, the processor may acquire the user's biometric information through the sensor (e.g., sensor 230 of FIG. 2 or sensor 350 of FIG. 3). For example, the processor may acquire at least one of user's fingerprint information, iris information, or facial information through the sensor (e.g., a biosensor or image sensor, etc.).

In an embodiment, at operation 407, the processor may determine whether the acquired biometric information matches the biometric information stored in the memory (e.g., memory 220 of FIG. 2).

In an embodiment, if the acquired biometric information matches the biometric information stored in the memory, the processor, at operation 409, may determine authentication is successful and approve the connection of the external device inserted through at least one connector. For example, the processor may control the switch (e.g., first switch 360 or second switch 370 of FIG. 3) connected to the at least one connector (e.g., control the switch in an on state) to communicatively connect to the external device inserted through the at least connector.

In an embodiment, in a state where the external device is connected, the processor may acquire the user's biometric information through the sensor at a predesignated time interval. If the biometric information acquired through the sensor at the designated time interval does not match the biometric information stored in the memory, the processor may control the switch connected to the connector into which the external device (e.g., control the switch in an off state) to block the connected external device.

In an embodiment, the processor may detect the separation of the external device from the at least one connector through the current sensing circuit. If the separation of the external device from the at least one connector is detected, the processor may control the switch connected to the at least one connector (e.g., control the switch in an off state) to block the communicative connection to the at least one connector.

In an embodiment, if the acquired biometric information does not match the biometric information stored in the memory, the processor at operation 411, may determine authentication is unsuccessful and block the connection of the external device inserted through the at least one connector. For example, the processor may control the switch connected to the at least one connector (e.g., control the switch in an off state) to block the connection of the external device inserted into the at least one connector.

In an embodiment, if the acquired biometric information does not match the biometric information stored in the memory, the processor may display, on the display, the user interface related to a state where the connection of the external device is blocked in accordance with the user authentication failure.

Figure 5:
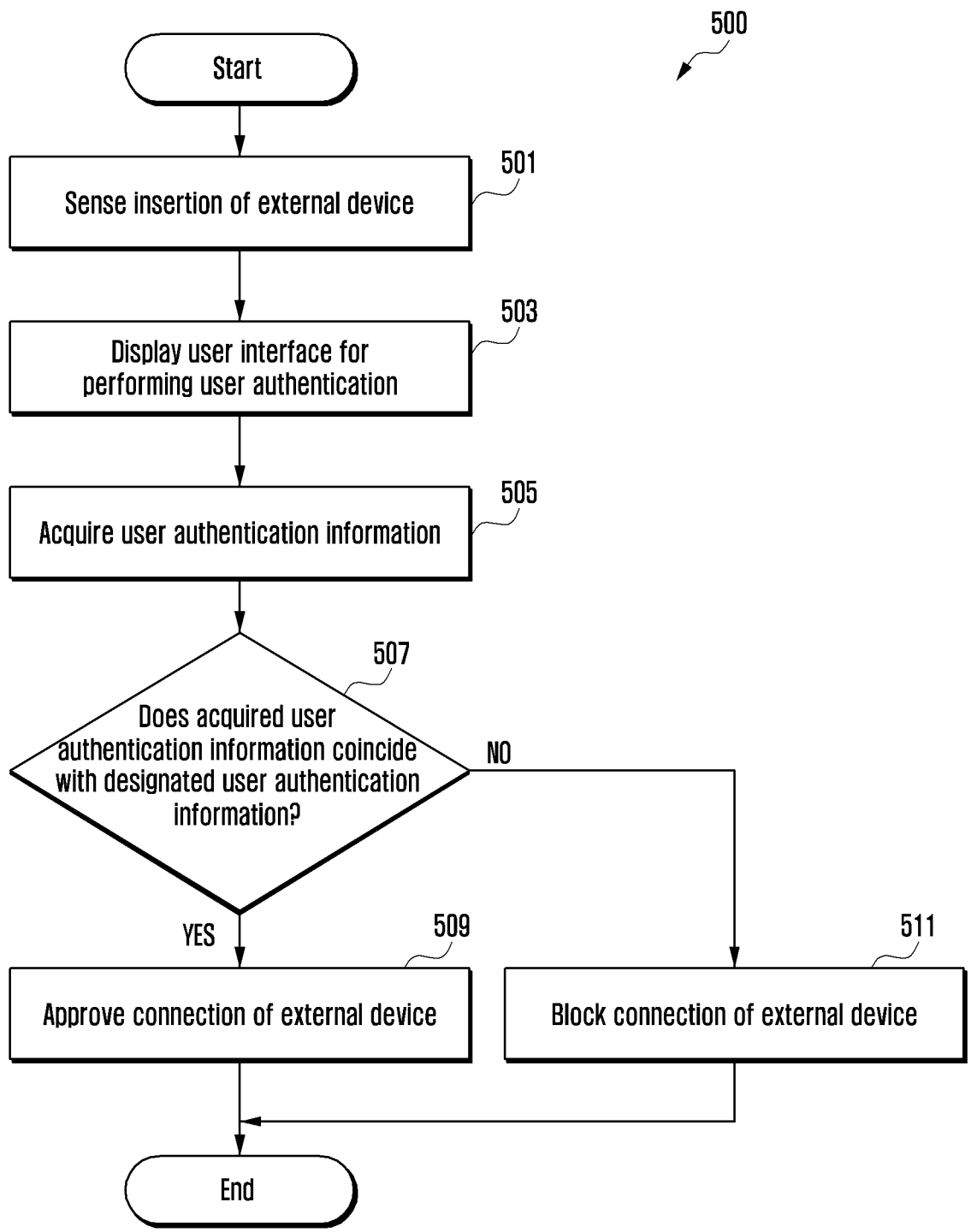
FIG. 5 is a flowchart illustrating a method for controlling a connection of an external device based on user authentication information according to certain embodiments.

FIG. 5 is a flowchart 500 illustrating a method for controlling a connection of an external device based on user authentication information according to certain embodiments.

With reference to FIG. 5, at operation 501, the processor (e.g., processor 250 of FIG. 2 or processor 340 of FIG. 3) may sense the insertion of the external device into at least one connector (e.g., connector 210 of FIG. 2 or connector 310 of FIG. 3).

In an embodiment, if the insertion of the external device is detected, the processor, at operation 503, may display a user interface for performing user authentication on a display (e.g., display 241 of FIG. 2).

In an embodiment, the operations 501 and 503 are the same as the operations 401 and 403 of FIG. 4 as described above, and thus the detailed explanation thereof will be omitted.

In an embodiment, at operation 505, the processor may acquire the user authentication information. For example, the user authentication information may include at least one of a designated password, designated pattern data, or user's biometric information (e.g., user's facial information acquired form the image sensor, such as the camera module 180 of FIG. 1, iris information, user's speech information acquired from the audio module such as the audio module 170 of FIG. 1, or user's fingerprint information acquired from the fingerprint sensor).

In an embodiment, at operation 507, the processor may determine whether the acquired user authentication information matches the designated user authentication information. For example, the processor may determine whether the acquired user authentication information matches the user authentication information stored in the memory (e.g., memory 220 of FIG. 2).

In an embodiment, if the acquired user authentication information matches the designated user authentication information, the processor, at operation 509, may approve the connection of the external device inserted through the at least one connector. If the acquired user authentication information does not match the designated user authentication information, the processor, at operation 511, may block the connection of the external device inserted through the at least one connector.

In an embodiment, the operations 509 and 511 are the same as the operations 409 and 411 of FIG. 4 as described above, and thus the detailed explanation thereof will be omitted.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    at least one connector;
    at least one switch electrically connected to the at least one connector;
    a sensor;
    a memory; and
    a processor electrically connected to the at least one connector, the at least one switch, the sensor, and the memory, wherein the processor is configured to:
    detect an insertion of an external device into the at least one connector based on an electrical signal input through the at least one connector,
    receive biometric information using the sensor after detecting the insertion of the external device, and
    control a switch electrically connected to the connector to be connected to the connector into which the external device is inserted, when the received biometric information matches biometric information stored in the memory.

2. The electronic device of claim 1, wherein the processor is further configured to:
    control the switch electrically connected to the connector to block the connection to the connector into which the external device is inserted, when the biometric information received through the sensor does not match the stored biometric information.

3. The electronic device of claim 1, wherein the biometric information is received through the sensor at a designated time interval after the external device is inserted.

4. The electronic device of claim 3, wherein the processor is further configured to:
    compare the biometric information received at the designated time interval with the stored biometric information, and
    control the switch electrically connected to the connector to block the inserted external device when the biometric information received through the sensor at the designated time interval does not match the stored biometric information; and
    control the switch electrically connected to the connector to maintain the connector in a connected state when the biometric information received at the designated time interval matches the stored biometric information.

5. The electronic device of claim 1, further comprising a power switch circuit for providing power through the at least one connector, wherein the processor is further configured to:
    prior to insertion of the external device, activate the power switch circuit to initiate provision of power to the at least one connector.

6. The electronic device of claim 1, further comprising a touch screen display, wherein the processor is further configured to:
    control the touch screen display to display a user interface associated with performing user authentication using the sensor, in response to detecting the insertion of the external device.

7. The electronic device of claim 2, wherein the processor is further configured to:

display a user interface for indicating authentication failure when the biometric information received through the sensor does not match the stored biometric information.

8. The electronic device of claim 1, further comprising a current sensing circuit, wherein the processor is further configured to:
determine, via the current sensing circuit, a value of the electrical signal generated from the power provided by the power switch circuit and detected through the current sensing circuit,
wherein the insertion of the external device is confirmed when the determined value exceeds a designated value.

9. The electronic device of claim 8, wherein the processor is further configured to:
control the switch electrically connected to the connector to block the connection to the connector when separation of the external device from the connector is detected through the current sensing circuit.

10. A method in an electronic device, comprising:
detecting insertion of an external device into at least one connector based on an electrical signal input through the at least one connector;
receiving biometric information using a sensor after detecting the insertion of the external device; and
controlling a switch electrically connected to the connector to be connected to the connector into which the external device is inserted when the received biometric information matches biometric information stored in a memory.

11. The method of claim 10, further comprising controlling the switch electrically connected to the connector to block the connection to the connector into which the external device is inserted when the biometric information received through the sensor does not match the biometric information stored in the memory.

12. The method of claim 10, wherein the biometric information is received through the sensor at a designated time interval after the external device is inserted.

13. The method of claim 12, further comprising:
comparing the biometric information received at the designated time interval with the biometric information stored in the memory; and
controlling the switch electrically connected to the connector to block the inserted external device when the biometric information received through the sensor at the designated time interval does not match the biometric information stored in the memory.

14. The method of claim 13, further comprising:
controlling the switch electrically connected to the connector to maintain the connector in a connected state when the biometric information received at the designated time interval matches the stored biometric information.

15. The method of claim 10, further comprising:
displaying, on a touch screen display, a user interface associated with performing user authentication using the sensor, in response to detecting the insertion of the external device.

16. The method of claim 11, further comprising:
displaying, on a touch screen display, a user interface for indicating authentication failure when the biometric information received through the sensor does not match the biometric information stored in the memory.

17. The method of claim 10, further comprising:
determining, via a current sensing circuit, a value of the electrical signal sensed generated from the power provided by the power switch circuit and detected through the current sensing circuit,
wherein the insertion of the external device is confirmed when the determined value exceeds a designated value.

18. The method of claim 17, further comprising:
controlling the switch electrically connected to the connector to block the connection to the connector when separation of the external device from the connector is detected through the current sensing circuit.

19. An electronic device comprising:
at least one connector;
at least one switch electrically connected to the at least one connector;
a memory; and
a processor electrically connected to the at least one connector, the at least one switch, and the memory, wherein the processor is configured to:
detect insertion of an external device into the at least one connector based on an electrical signal input through the at least one connector,
receive user authentication information after detecting the insertion of the external device, and
control a switch electrically connected to the connector to be connected to the connector into which the external device is inserted when the received user authentication information matches user authentication information stored in the memory.

20. The electronic device of claim 19, wherein the processor is configured to:
control the switch to block the connection to the connector when the received user authentication information does not match the stored user authentication information.

* * * * *